United States Patent [19]
Onoda et al.

[11] Patent Number: 5,199,307
[45] Date of Patent: Apr. 6, 1993

[54] AUTOMATIC POWER GENERATION TYPE FLOWMETER

[75] Inventors: Hajime Onoda; Wataru Sato, both of Tokyo, Japan

[73] Assignee: Kimmon Manufacturing Co., Ltd., Tokyo, Japan

[21] Appl. No.: 641,870

[22] Filed: Jan. 16, 1991

[30] Foreign Application Priority Data

Jan. 20, 1990 [JP] Japan .................................. 2-11242
Apr. 13, 1990 [JP] Japan .............................. 2-39031[U]

[51] Int. Cl.$^5$ .......................................... G01F 1/075
[52] U.S. Cl. ............................................ 73/861.78
[58] Field of Search .............. 73/861.78; 310/75 A, 310/78

[56] References Cited

U.S. PATENT DOCUMENTS

| | | | |
|---|---|---|---|
| 2,822,688 | 2/1958 | Wiley | 73/861.78 |
| 3,094,637 | 6/1963 | Bergstrasser | 310/168 |
| 3,599,022 | 7/1970 | Adair . | |
| 3,676,875 | 7/1972 | Adams et al. . | |
| 3,685,353 | 8/1972 | Gestler et al. | 73/861.78 |
| 3,772,917 | 11/1973 | Lotz et al. | 73/861.78 |
| 4,598,594 | 7/1986 | Painley | 73/861.78 |

FOREIGN PATENT DOCUMENTS

| | | |
|---|---|---|
| 2111091 | 3/1971 | Fed. Rep. of Germany . |
| 60-135822 | 7/1985 | Japan . |
| 608610 | 1/1979 | Switzerland . |
| 906903 | 9/1962 | United Kingdom . |

Primary Examiner—Herbert Goldstein
Attorney, Agent, or Firm—Frishauf, Holtz, Goodman & Woodward

[57] ABSTRACT

An automatic power generation type flowmeter generates a measuring signal through measuring of a flow rate of fluid flowing through a passage and transmits it to a receiver at a remote location. The flowmeter includes a power generator coupled to a detection shaft rotated under an action of a fluid flowing through the passage and outputting an electric signal. The power generator includes a permanent magnet having S- and N-poles, an electromagnetic coil having a core around its axis and arranged adjacent to the magnet with the axis of the coil located in a direction substantially perpendicular to a rotation shaft, a first stator magnetically coupled to the core and having its magnetic induction portion arranged opposite to the N-pole of the magnet, and a second stator magnetically connected to the core and having its magnetic induction portion arranged opposite to the S-pole of the magnet.

15 Claims, 12 Drawing Sheets

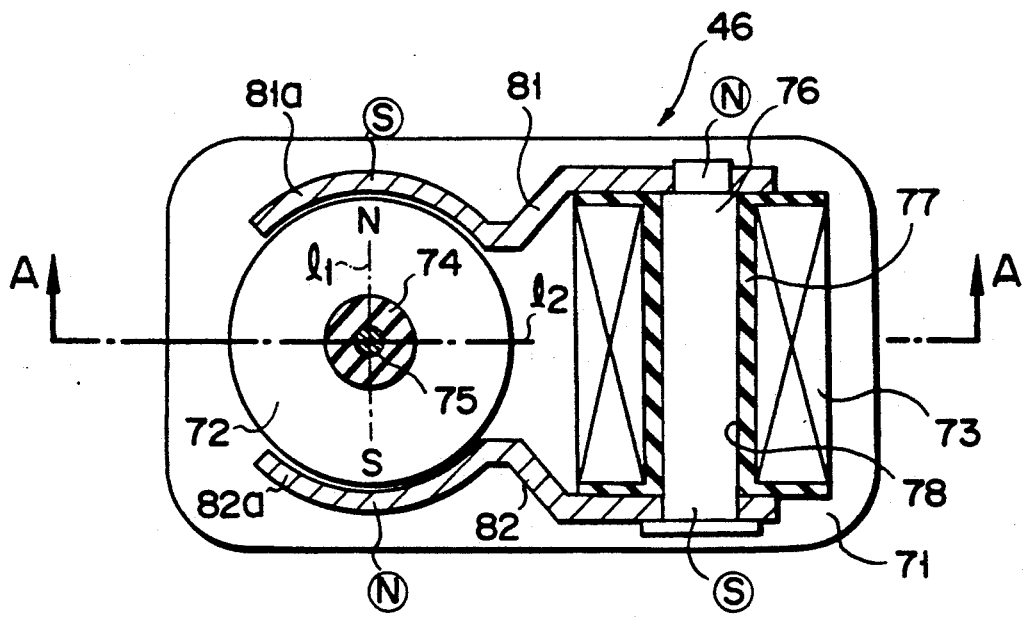
F I G. 6
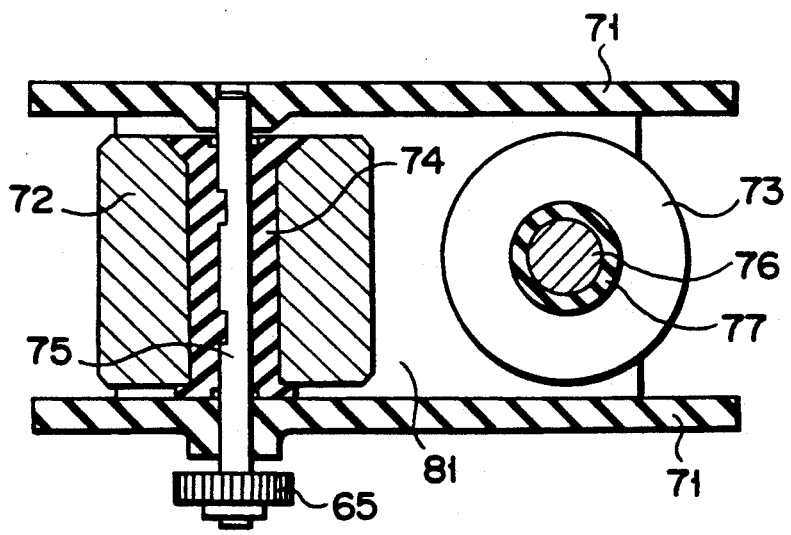
F I G. 7

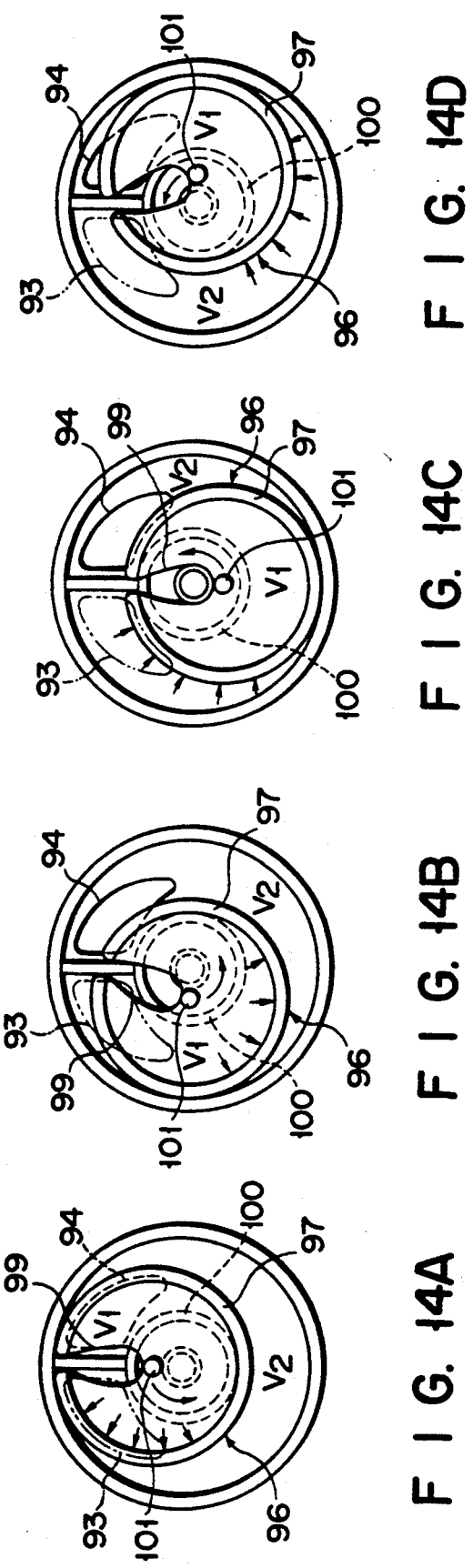

AUTOMATIC POWER GENERATION TYPE FLOWMETER

BACKGROUND OF THE INVENTION

1. Field of the Invention

The present invention relates to an automatic power generation type flowmeter having a power generation mechanism for oscillating a signal corresponding to a flow rate of fluid flowing through a specific location.

2. Description of the Related Art

An automatic power generation type water meter is known which is employed as a remote measuring meter having a power generation mechanism adapted to oscillate a signal corresponding to a flow rate of fluid flowing through a specific location without the need of any external power source. The water meter includes, main and auxiliary casings which are separately formed. The main casing has a flow inlet and a flow outlet. The auxiliary casing has a cylindrical shape and accommodates a receiver unit and a power generation mechanism or transmission unit. An impeller is arranged partway of a passage in the main casing and has a rotation shaft coupled through a first speed-reduction gear group and magnetic coupling to a second speed-reduction gear group in the auxiliary or receiver casing. The power generation mechanism is coupled to the second speed-reduction gear group. The power generation mechanism rotates a magnet, producing a magnetic flux change in a core of an electromagnetic coil and hence an induction magnetomotive force.

In the automatic power generation type water meter so constructed, in addition to the main casing, the receiver unit casing is mounted in place with the transmitting unit incorporated therein. The magnet and overlying electromagnetic coil's core of the power generation mechanism are arranged coaxial with each other in a direction of their height. Therefore, the transmitting unit and hence the receiver casing becomes higher. As a result, the transmitting unit-equipped water meter becomes bulkier in the height direction, thus occupying a larger area for installation.

SUMMARY OF THE INVENTION

It is accordingly an object of the present invention to provide an automatic power generation type flowmeter which can be mounted as a compact unit in an otherwise inaccessible installation site.

Another object of the present invention is to provide an automatic power generation type flowmeter which can make a transmitting unit compact and still ensure a greater electromotive force.

The object of the present invention can be accomplished by an automatic power generation type flowmeter adapted to generate electric power, as a measuring signal, through measurement of a flow rate of fluid flowing through a passage and transmit the measuring signal to a receiver at a remote location, comprising:

(1) detecting means, having a detection mechanism receiving an action of the fluid flowing through the passage and detecting a flow rate and a detection shaft driven by the detection mechanism, for converting the flow rate to the number of rotations of the detection shaft;

(2) transmission means for receiving a rotational force of the detection shaft of the detecting means and for converting it to an intermittent rotation; and (3) power generation means for outputting an electric signal corresponding to the flow rate of flowed fluid through the utilization of the intermittent rotation transmitted through the transmission means, the power generating means having:

(a) a permanent magnet including a rotation shaft connected to the transmission means and having N- and S-poles on an outer periphery across a center of the rotation shaft;

(b) an electromagnetic coil including a core having one and the other end in an axial direction and wound around the axis of the core, the core being located adjacent to the magnet such that its axis is oriented in a direction perpendicular to the rotation shaft;

(c) a first stator having one and the other end portions, the one end portion being magnetically coupled to one end of the core and said other end portion facing the N-pole of the magnet in a parallel relation to the latter; and (d) a second stator having one and the other end portions, the one end portion being magnetically coupled to said other end of the core and said other end portion facing the S-pole of the magnet in a parallel relation to the latter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a transverse view diagrammatically showing a power generation mechanism of the first embodiment of the present invention;

FIG. 7 is a view as taken along line A—A in FIG. 6;

FIGS. 14A to 14D are explanatory views showing an order of operations of a rotary piston type measuring unit of the third embodiment.

DETAILED DESCRIPTION OF THE PREFERRED EMBODIMENTS

The embodiment of the present invention will be explained below with reference to the accompanying drawings.

FIGS. 1 to 7 shows a first embodiment of the present invention.

Figure 1:
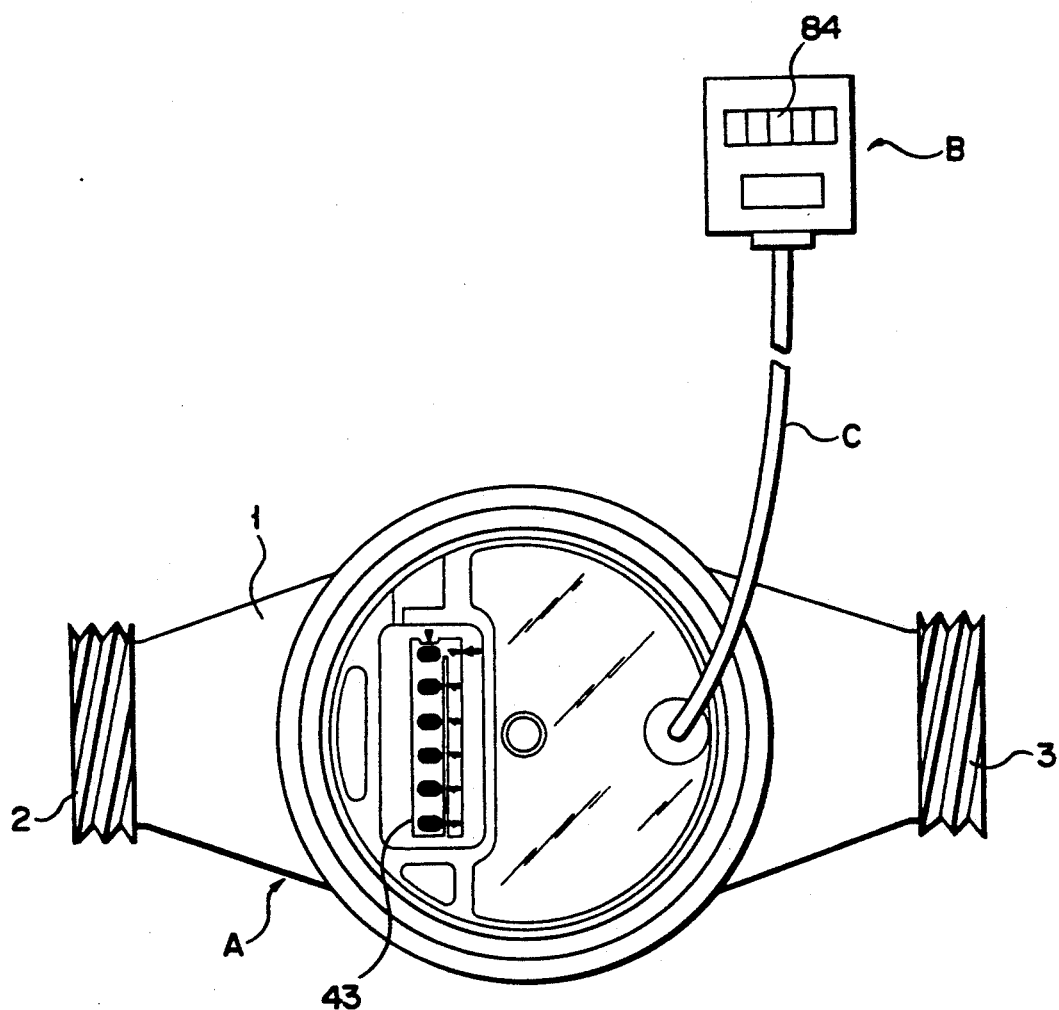
FIG. 1 is a plan view showing an automatic power generation type water meter according to a first embodiment of the present invention.

FIG. 1 shows an impeller type water meter A, a receiver B and a signal cable C connecting together the two.

Figure 2:
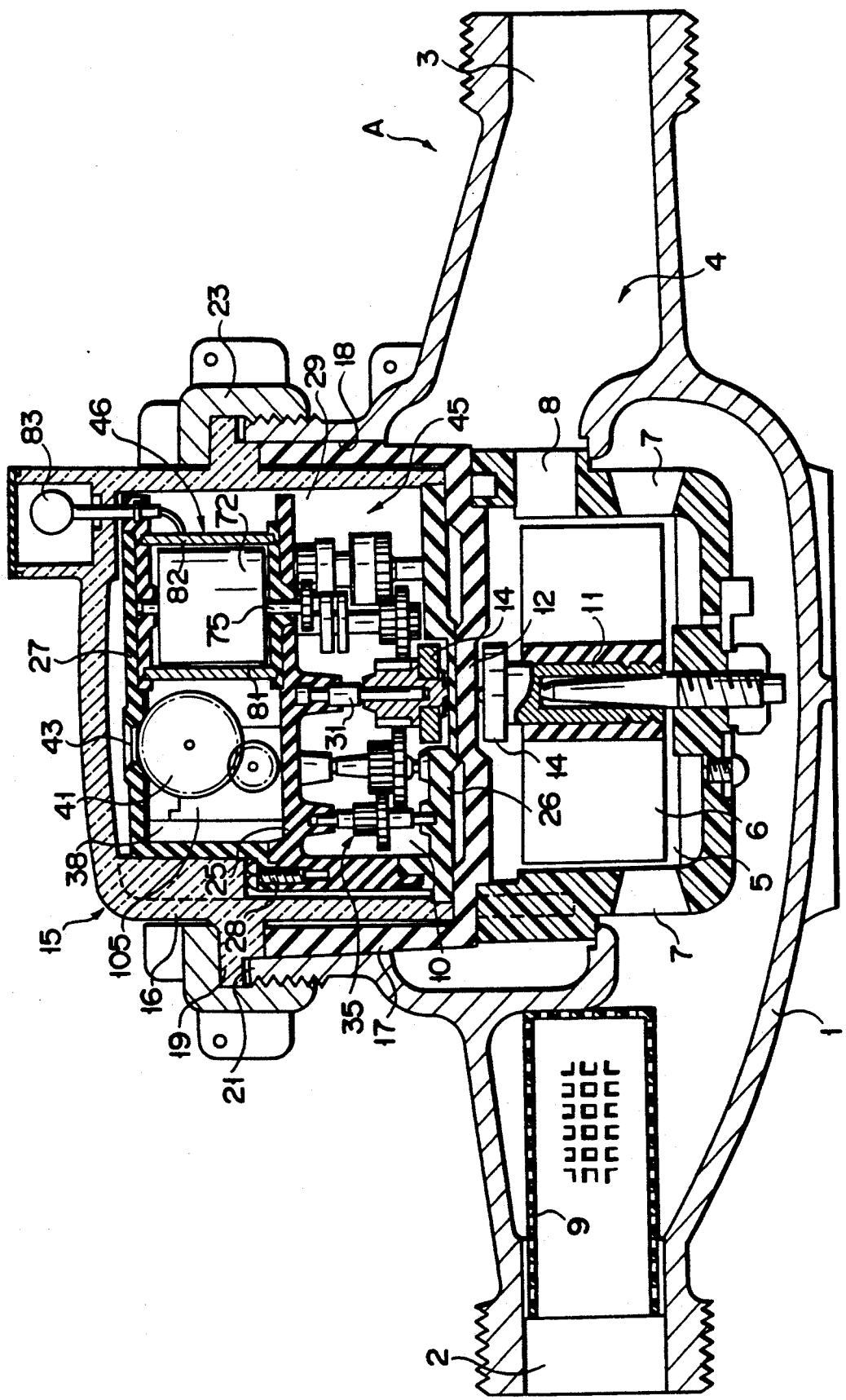
FIG. 2 is a longitudinal view, in cross-section, diagrammatically showing a water meter according to a first embodiment of the present invention.

A water meter body or casing 1 of the water meter A includes a flow inlet 2 and a flow outlet 3. As shown in FIG. 2, the meter body 1 includes a passage 4 connected at one end to the flow inlet 2 and at the other end to the flow outlet 3. An impeller chamber 5 is created partway of the passage 4 and contains an impeller 6 adapted to be rotated by a water stream. A plurality of inlets 7 and of outlets 8 are formed in the circumferential wall of the impeller chamber 5. Running water supplied from a water service pipe enters from the flow inlet 2 via the inlets 7 into the impeller chamber 5, rotating the impeller 6. Then the running water flows toward the flow outlet 3 via the outlet 8 of the chamber 5. The impeller 6 is rotated, by the running water in the passage 4, at a rotation number rate corresponding to a flow of water. The impeller 6 constitutes a flow detection mechanism. The rotation of a rotation shaft 11 of the impeller 6 indicates the number of rotations corresponding to the flow of water running through the passage 4. A strainer 9 is provided at the flow inlet 2.

The rotation shaft 11 of the impeller 6 is coupled via a magnetic coupling 12 to a rotation transmission system in a flow measuring unit 10. The magnetic coupling 12 has a pair of disc-like magnets 14. A transmission disc 14 of the magnet coupling 12 is fixed to the upper end of the rotation shaft 11 of the impeller 6.

The flow measuring unit 10 is incorporated a casing 15 which serves also as an oscillation unit casing. The casing 15 has an upper casing section 16 having a cylindrical crown configuration and a lower cylindrical casing section 17 having a bottom, and is assembled by inserting the circumferential wall of the upper casing section 16 into the circumferential wall of the lower casing section 17. The measuring unit casing 15 is fitted into an opening 18 of the water meter body 1 such that a flange 19 provided on the outer peripheral wall surface of the upper casing section 16 is placed in contact with an upper edge 21 of the opening 18 to locate the casing 15 relative to the meter body 1. The flange 19 is clamped against the meter body 1 by an annular clamping member 23 which is threaded on the outer peripheral surface of the upper edge portion of the meter body 1. In this way, the measuring unit casing 15 is detachably mounted on the meter body casing 1.

Figure 3:
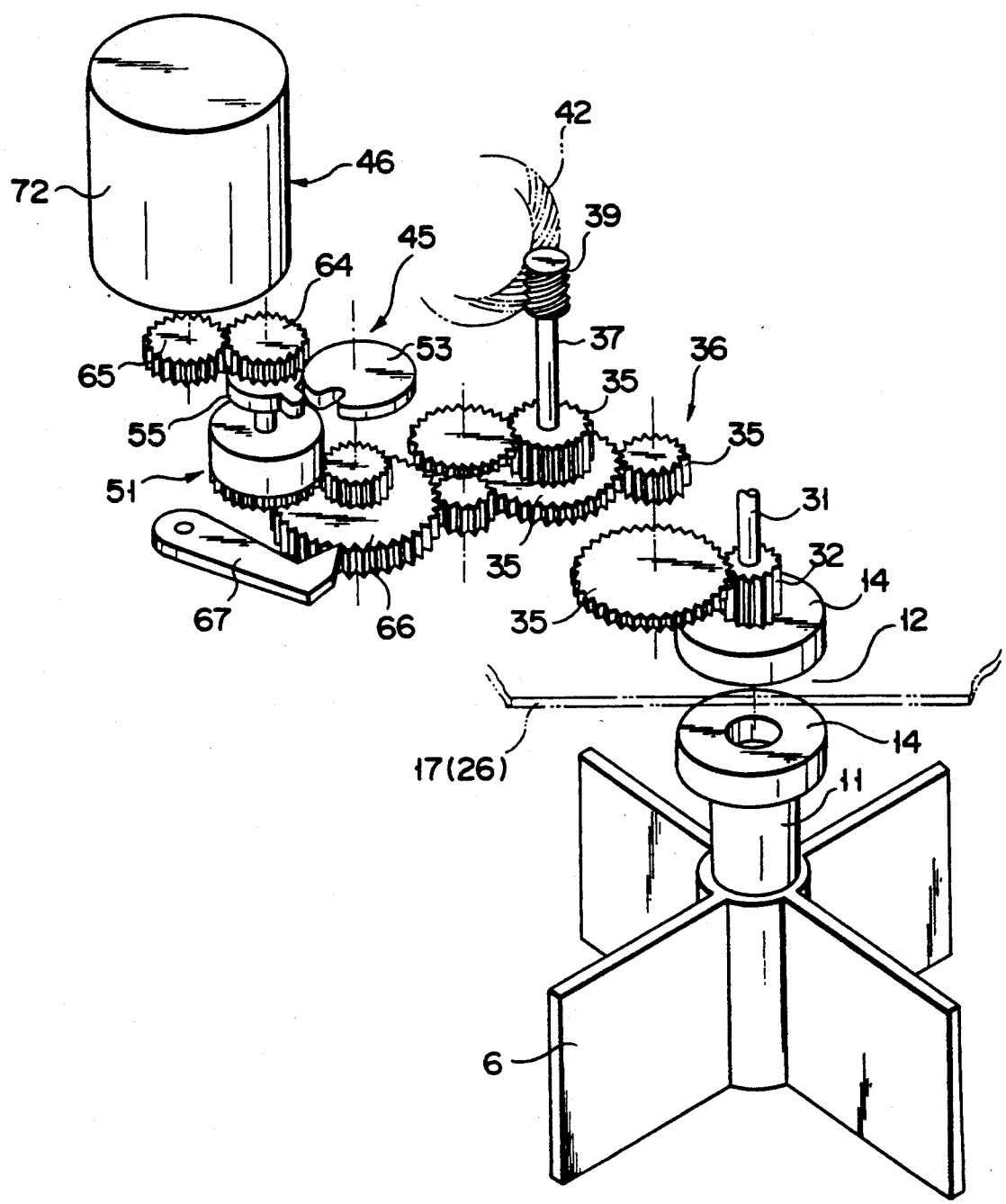
FIG. 3 is a perspective view showing a detection mechanism, transmission mechanism and magnet of the first embodiment of the present invention.

An intermediate base plate 25, lower base plate 26 and covering plate 27 are located in the measuring unit casing 15 in a substantially intermediate, a lower and an upper position, respectively. The intermediate plate 25 and covering plate 27 are secured, by screw means 28, at the marginal edge portions of these plates. At least the lowering base plate 26 is formed of a non-magnetic material, such as an AS (acrylonitrile-styrene) resin. A transmission mechanism chamber 29 is defined between the intermediate plate 25 and the lower base plate 26 and contains a rotation transmission system as will be set out below. The intermediate base plate 25 and lower base plate 26 provide bearing sections for rotation bodies, such as gears, of the rotation transmission system. In a substantially central area of the chamber 29, a bearing pin 31 is provided which is fixed to the intermediate plate 25 and extends downwardly. A gear 32 is rotatably supported on the bearing pin 31 as shown in FIG. 3. The disc 14 on the transmit-side of the magnetic coupling 12 is fixed to the gear 32 in a manner to face a substantially central area of the lower base plate 26 in proximate relation.

A speed-reduction gear group 36 in the transmission mechanism is connected to the gear 32. A rotation shaft for respective gears 35 in the speed-reduction gear group 36 is rotatably supported between the intermediate base plate 25 and the lower base plate 26.

The transmission shaft for one gear 35 in the speed-reduction gear group 36 as referred to as 37 in FIG. 3 extends into a chamber 38 for a flow indication mechanism which is defined between the intermediate base plate 25 and the covering plate 27. A worm gear 39 is mounted on the forward end of the transmission shaft 37. The worm gear 39 engages with a driven gear 42 in a group of digit wheels 41 which are mounted as a flow indicator in erect fashion. The digit wheels 41 are located opposite to the indicator window 43 in the covering plate 27 to allow them to be visually reviewed through a transparent wall area of the upper casing section 16.

The output terminal of the speed-reduction gear group 36 is coupled to a power generation mechanism 46 through a quick intermittent drive mechanism 45 in the transmission mechanism. A power generation mechanism 46 is provided in the aforementioned chamber 38 at a location between the intermediate base plate 25 and the covering plate 27 such that it is located adjacent to the digit wheel 41.

Figure 4:
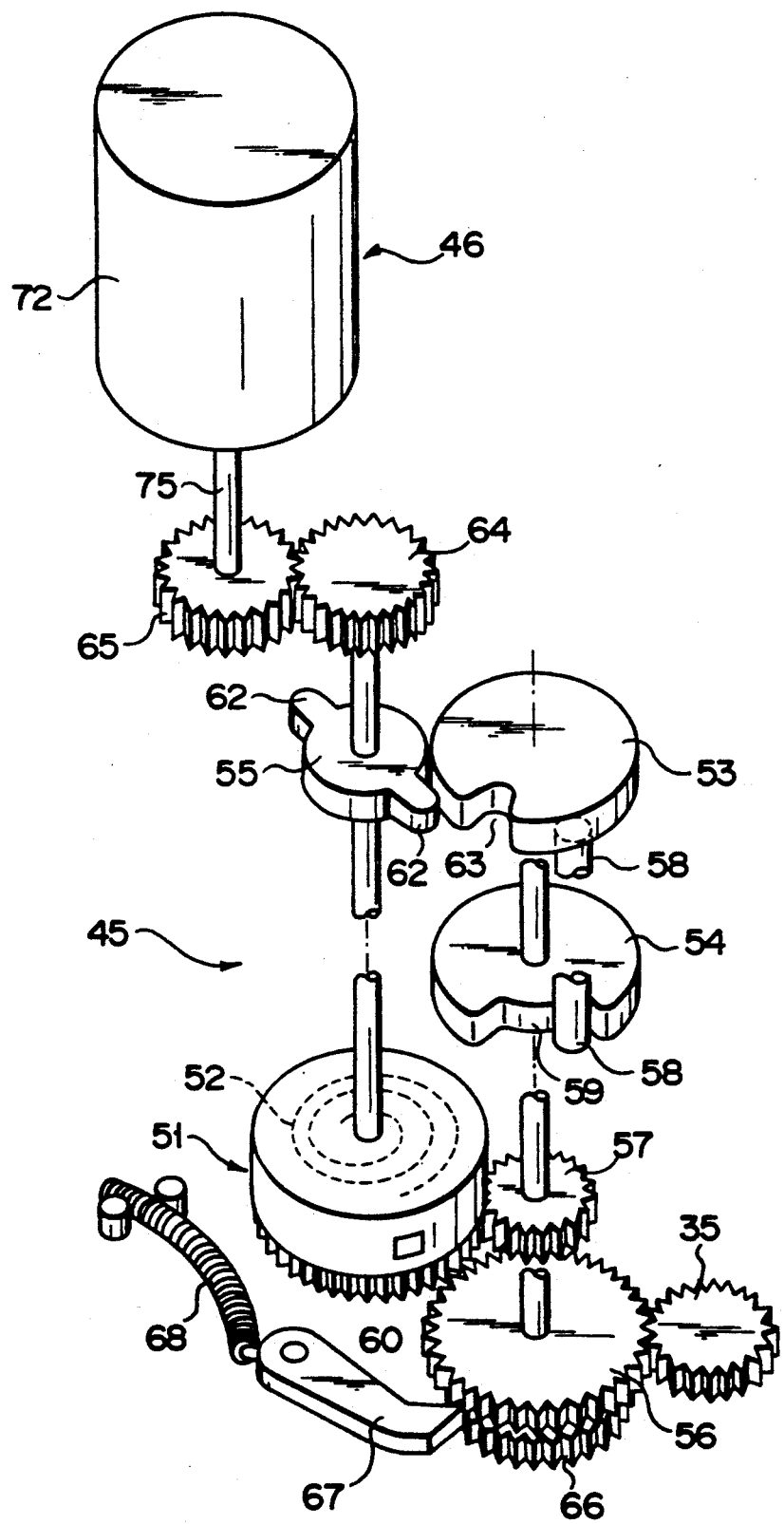
FIG. 4 is a perspective view diagrammatically showing a quick intermittent drive mechanism of the first embodiment of the present invention.

The mechanism 45 includes, as shown in FIG. 4, a rotation force temporary storage mechanism 51 with a flat spiral spring 52, a lock cam 53, an unlock cam 54 and a lock gear 55. A gear 57 for winding up the flat spiral spring 52 and unlock cam 54 are coupled to a rotation shaft of a gear 56 rotationally driven from the speed-reduction gear group 36 so that they are rotated together with the rotation shaft. A cam recess 59 is provided on the unlock cam 54 to receive a pin 58 which extends from the lock cam 53 coaxial with the unlock cam 54. When the unlock cam 54 is rotated by an amount corresponding to a width of the cam recess 59, the lock cam 53 is rotated at one pitch. One cutout 63 is provided in the outer periphery of the lock cam 53 so that one of dents 62 of the lock gear 55 engages with the cutout 63 of the lock cam 53. The lock gear 55 is connected through the flat spiral spring 52 to a gear 60 in mesh with the gear 57. The rotational force of the lock gear 55 is transmitted to a gear 64 mounted coaxial with the lock gear 55. A drive gear 65 of the power generation mechanism 46 engages with the gear 64. The rotation of the gear 64 is transmitted to the drive gear 65. The lock gear 55 is prevented from being rotated, while the outer peripheral edge of the lock cam 53 is brought to a location between the dents 62. When the lock cam 53 is rotated so that the dent 62 of the lock gear 55 is brought into engagement with the cutout 63 of the lock cam 53, then the lock gear 55 is rotated at one pitch under a stored energy of the flat spiral spring 52. The stored energy of the spring 52 causes the power generation mechanism 46 to rotate temporarily. The gear 56 has a lachet gear 66 with which a pawl 67 engages. The reverse rotation of the lachet gear 66 is prevented by the pawl 67. An elastic force is urged by a closely coiled spring 68 toward the lachet gear 66.

The running water as set out above flows via the flow inlet 2 of the meter body 1 into the passage 4 and reaches the impeller 6, causing the impeller 6 to rotate an amount corresponding to an amount of water flowed. The rotational force is transmitted to the gear 32 in the transmission mechanism through the magnetic coupling 12. The rotational force of the gear 32 is transmitted through the speed-reduction gear group 36 to the digit wheel 41, serving as the indication mechanism, to indicate an amount of water flowed. At the same time, the aforementioned rotational force is transmitted through the speed-reduction gear group 36 to the quick intermittent drive mechanism 45, thereby momentarily rotating the power generation mechanism 46 in intermittent fashion.

Figure 5:
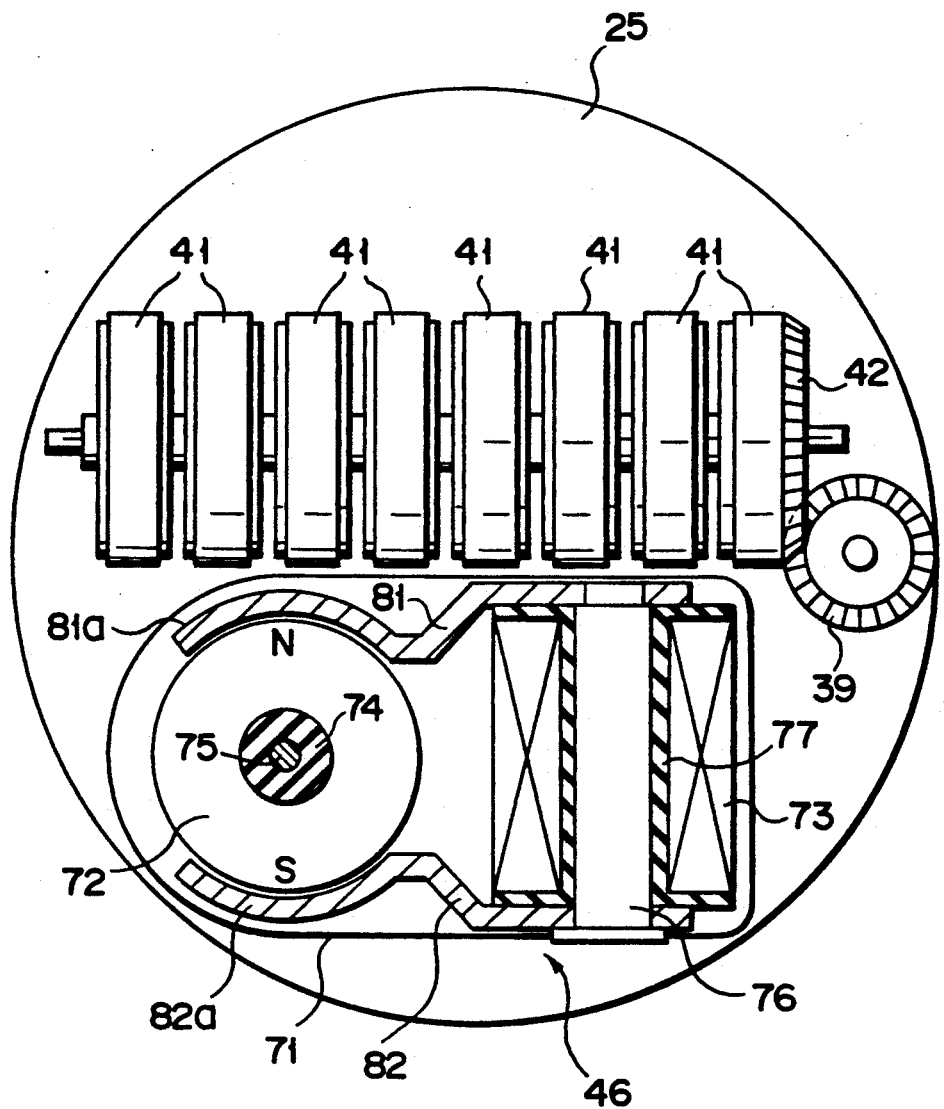
FIG. 5 is a transverse view diagrammatically showing digit wheels and power generation mechanism of the first embodiment of the present invention.

The power generation mechanism 46 is so constructed as shown in FIGS. 5 to 7, that is, is comprised of constituent members arranged between a pair of nonmagnetic plates 71, 71, upper and lower. The mechanism 46 is located adjacent to the digit wheels 41 in proximity relation. In the power generation mechanism 46, a cylindrical magnet (rotor) 72 and an electromagnetic coil 73 are disposed along an axial direction of the digit wheels 41 as arranged in a series array. The rotation shaft 75 is attached by a non-magnetic sleeve 74 to the cylindrical magnet 72 with both ends of the shaft 75 rotatably supported at the pair of plates 71, 71. The rotation shaft 75 is located in a vertical state. The cylindrical magnet 7 is rotatably supported in an upright state in the measuring unit casing 15. The drive gear 65 mounted on the rotation shaft 75 of the magnet 72 receives a rotational force from the gear 65 on the output side of the mechanism 45 of the transmission system and is rotated in intermittent fashion.

The cylindrical magnet 72 is comprised of a permanent magnet whose N- and S-poles are located in a point-symmetrical relation to each other with the axis of the cylindrical magnet 72 as a center as shown in FIG. 6. A bar-like core 76 is provided adjacent to the magnet 72 such that it is set in a lateral direction, that is, in a direction orthogonal to the magnet 72. The core 76 is tightly inserted into a hollow hole 78 of a bobbin 77 and the electromagnetic coil 73 is wound around the bobbin 77 with the bar-like core 76 provided at the center of the coil 73. One end of a first stator 81 is magnetically and mechanically coupled to one end of the bar-like core 76 and one end of a second stator 82 is magnetically and mechanically coupled to the other end of the bar-like core 76.

The width of the magnet 72 as defined along the axial direction of the rotation shaft 75 of the magnet 72 is set to be substantially equal to a length of the first and second stators 81 and 82 as defined along the axial direction of the rotation shaft 75 of the magnet 72. Further, the length as defined along the core 76 of the electromagnetic coil 7 is set to be substantially equal to the diameter of the magnet 72.

The first and second stators 81 and 82 provide circular-arc sections 81a and 82a at their other end portion. The magnetic 72 is connected to the mechanism 45 and the circular-arc sections 81a and 82a of the stators 81 and 82 face the magnet along and adjacent to the outer peripheral surface of the N- and S-pole areas of the magnet 72 in readiness for an operation. The respective circular-arc sections 81a and 82a of the first and second stators provide magnetic induction sections, respectively, magnetized by the N- and S-poles of the magnet 72.

The circular-arc sections 81a and 82a of the first and second stators 81 and 82 are made equal in length to each other, as shown in FIG. 6, as viewed in and along the circumferential direction of the magnet 72. The lengths of the circular-arc sections 81a and 82a defined along the outer periphery of the magnet 72 are symmetric to each other along a marginary line l1 connecting the N- to S-poles of the magnet 72 past the center of the magnet and along a marginary line l2 orthogonal to the marginary line l1.

As shown in FIGS. 5 and 6, in the stationary state of the magnet 72, the N- and S-pole areas of the magnet 72 are magnetically attracted to the circular-arc sections 81a and 82a of the first and second stators 81 and 82, respectively, with the circular-arc section of the first stator 81 being magnetized to an S-pole and the circular-arc section of the second stator 82 to an N-pole and the one end of the core 76 connected to the first stator being magnetized to the N-pole and the other end of the core 76 connected to the second stator 81 to the S-pole. When the magnet 72 is rotated, by the mechanism 45, through an angle of 180° from the aforementioned state, the N- and S-poles of the magnet 72 are exchanged and a corresponding polarity change occurs at the first and second stators 81 and 82. That is, the circular-arc sections (magnetic induction sections) 81a and 82a of the first and second stators 81 and 82 are magnetized to N- and S-poles, respectively, and, at the same time, the one end of the core 76 connected to the first stator 81 is magnetized to an S-pole and the other end of the core 76 connected to the second stator 82 magnetized to an N-pole. Since, in this way, an opposite magnetic flux is excited on the core 76 for each 180° rotation of the magnet 72, an induced electromotive force is generated in the electromagnetic coil 73 in accordance with a magnetic flux. An oscillation signal resulting from the induced electromotive force appears for each 180° rotation of the magnet 72. The oscillation pulse signal is transmitted from a terminal 83 past the signal cable C to the receiver B at a distant location. The receiver B processes the received signal, converts it to an equivalent amount of water flowing through the water meter, and displays it on a numerical display unit 84.

The power generation mechanism 46 of the water meter A receiver is located, in juxtaposition with the digit wheels 41, in the metering unit casing 15. The rotation shaft 75 of the magnet 72 is axially oriented in a direction of the height of the digit wheels 41 in the flow indicator and casing 105. Further, since the magnet 72 and core-equipped electromagnetic coil 73 in the power generation mechanism 46 are located side-byside along the axis of the digit wheels 41, the power generation mechanism 46 can be stored within the measuring unit casing 15 and made compact as a whole.

Although, in this embodiment, the magnet (rotor) 72 has been explained as being cylindrical in shape, a bar-like magnet, for example, may be fixed to the rotation shaft 75 so that it is rotated in a horizontal plane, provided that a magnet is of such a type that opposed poles are provided in symmetric rotation to each other.

In the aforementioned arrangement, the power generation mechanism comprises a rotor rotatably provided in an upright state in the transmitting unit casing contained in the water meter body and having a pair of poles (N- and S-poles) with its axis as a center, a core arranged adjacent to the rotor in a direction perpendicular to the rotor, an electromagnetic coil wound around the core, and a pair of cores opposing the N- and S-poles of the rotor. It is, therefore, possible to obtain a compact power generator, a lower water meter than a conventional counterpart, and a compact apparatus as a whole. The flowmeter of the present invention can be installed on an otherwise inaccessible location of an automated power generation type water meter. Further, since two-pole core configuration is used so as to increase the induced electromotive force of the power generation mechanism, it is possible to obtain an improved water meter with a smaller rotation drive torque and a smaller initial current flow.

Although, in the aforementioned embodiment, the cylindrical magnet 72 has been explained as being used as a rotor, use may be made of a magnet having opposed poles formed in a symmetric relation in which case a bar-like magnet may be rotatably supported in a horizontal plane.

Figure 8:
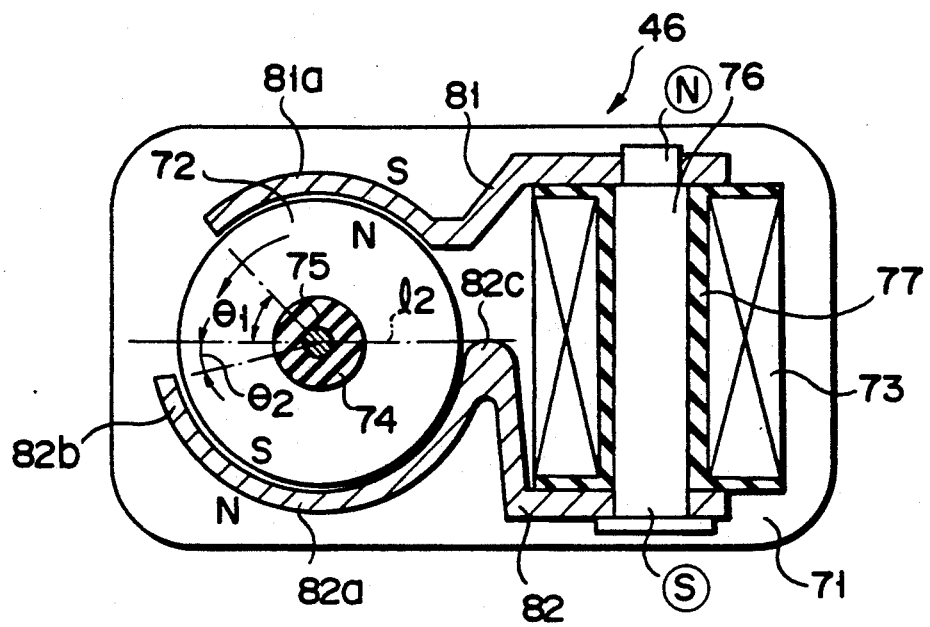
FIG. 8 is a transverse view diagrammatically showing a power generation mechanism according to a second embodiment of the present invention.
Figure 9:
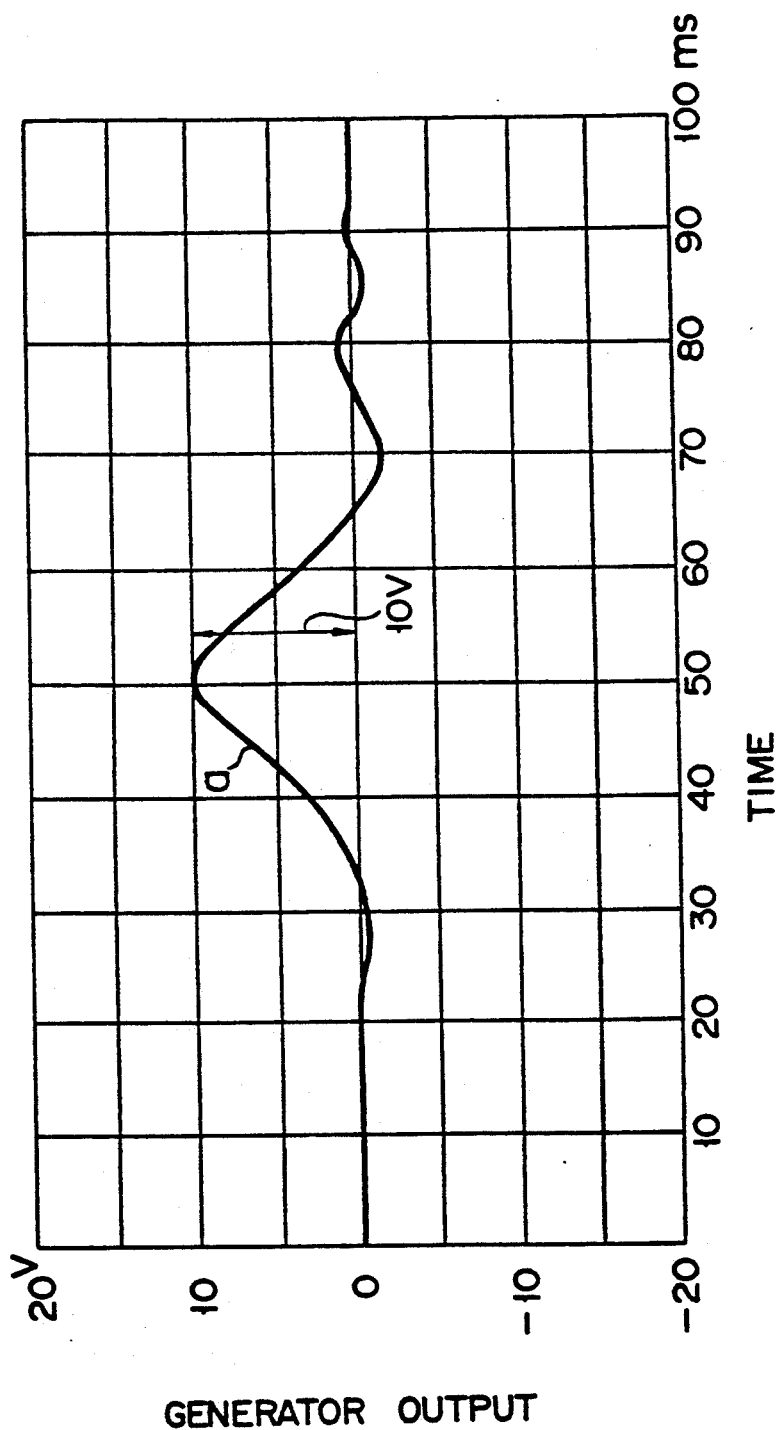
FIG. 9 is a view showing a characteristic curve representing an output voltage of a power generation mechanism according to a second embodiment of the present invention.

FIGS. 8 and 9 show a second embodiment of the present invention. In this embodiment, the same reference numerals are employed to designate parts or elements corresponding to those in the preceding embodiment and further explanation is, therefore, omitted except for the following respects. That is, a circular-arc section 81a of a first stator 81 is different from a circular-arc section 82a of a second stator 82 in terms of the length over which these circular-arc sections 81a and 82a extend along the outer periphery of a magnet 72. The circular-arc sections 81a and 82b of the first and second stators 81 and 82 are located in nonsymmetric relation to the magnet 72. The circular-arc section 81a of the first stator 81 is made shorter than the circular-arc section 82a of the second stator 82 with respect to their length as set out above. In this case, the circular-arc section 82a of the second stator 82 is of such a type that a forward end portion 82b and base end portion 82c extend further than in the first embodiment. In this case, the base end portion 82c, in particular, extends up to a center line 12 and a relation $\theta_1 > \theta_2$ exists between an angle $\theta_1$, on one hand, made between the forward end of the circular-arc section 81a and the line 12 and an angle $\theta_2$, on the other hand, made between the forward end of the circular-arc section 82a and the line 12.

This nonsymmetric array of the circular-arc sections 81a and 82a of the first and second stators 81 and 82 clockwise shifts a stationary position of the magnet 72 in readiness for an operation (see FIG. 8). A rotational drive torque upon the rotation of the magnet 72 from an initial ready state becomes smaller and the rotation speed of the magnet 72 is increased. For this reason, there exits a greater variation in a magnetic flux passing through a core 76 in the electromagnetic coil 73. In accordance with the Faraday's law of magnetic induction, a signal (a) of larger voltage is generated in an electromagnetic coil 73 as shown in FIG. 9. As in the case of the first embodiment, in the stationary ready state of the magnet 72, the circular-arc sections 81a and 82a of the first and second stators 81 and 82 are magnetically attracted to the N- and S-poles of the magnet 72 with one end of the core 76 on the first stator (81) side being magnetized to an N-pole and the other end of the core 76 on the second stator (82) side to an S-pole. Since, in this state, the magnet 72 is rotated, no reverse voltage emerges.

Figure 10:
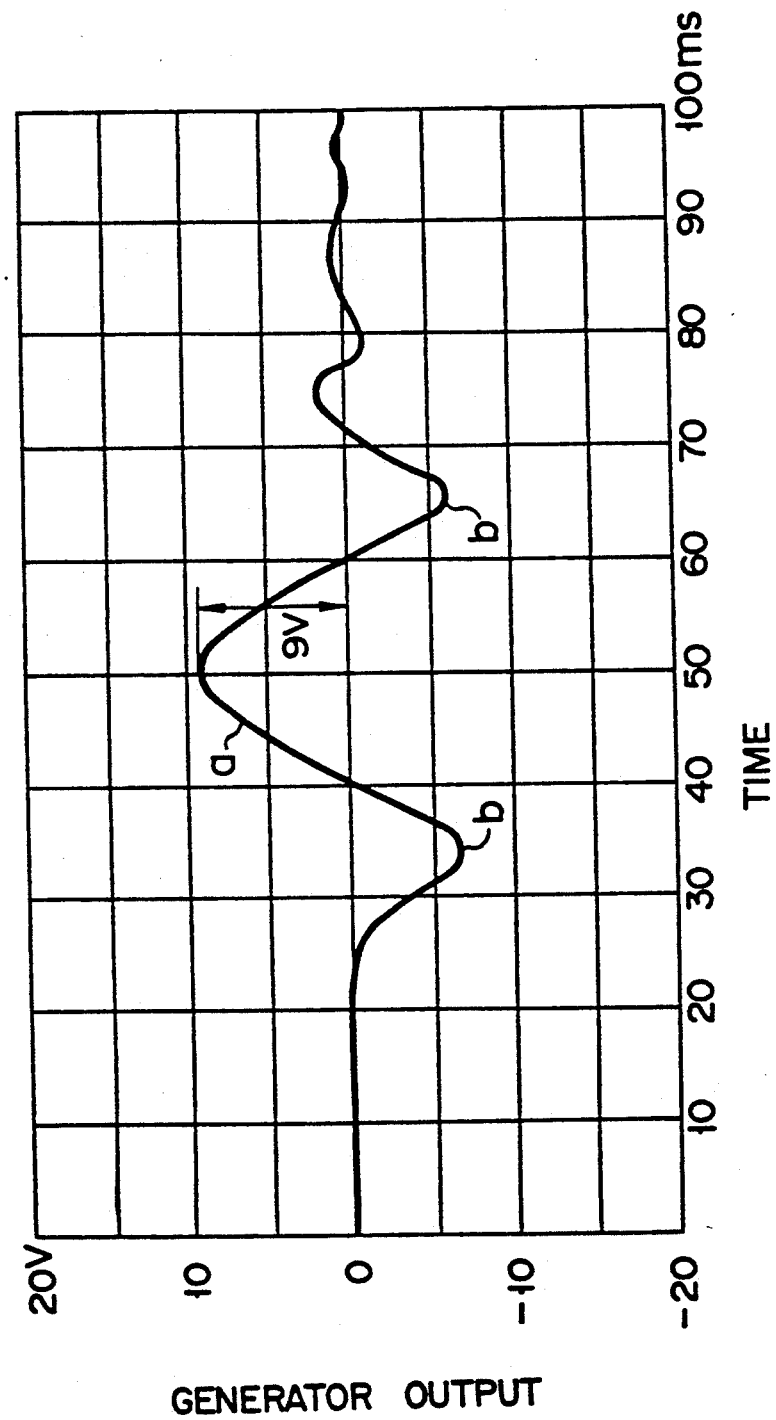
FIG. 10 shows a characteristic curve representing an output voltage of a different power generation mechanism from that of the second embodiment.

If the magnet 72 is once rotated in a reverse direction, a reverse voltage b is generated as shown in FIG. 10 but no reverse voltage b is developed, as shown in FIG. 9, in the preceding arrangement. Since the circular-arc section 82a of the second stator 82 is made longer than the circular-arc section 81a of the first stator 81 as shown in FIG. 8, a rotational torque of the magnet 72 is largely decreased compared with that of the preceding embodiment. It has been found that, in the arrangement shown in FIG. 8, the rotational torque is ⅔ times as small as that in the arrangement shown in FIG. 6 and, hence, the rotation speed of the magnet 72 is increased. When the magnet 72 is rotated through an angle of 180° from the state in which the circular-arc sections 81a and 82a of the first and second stators 81 and 82 are magnetically attracted to the magnet 72 as shown in FIG. 8, the polarities of the respective stators 81 and 82 abruptly change. As a result, there arises a greater variation in a magnetic flux passing through the electromagnetic coil 73 and an induced power output becomes greater in accordance with the Farady's low of electromagnetic induction.

According to the present invention, even if the power generation mechanism 46 is constructed as a smaller unit without the need to use the flat spiral spring 52 as a strong one, it is still possible to generate a prescribed voltage. Further, the power generation type water meter can be made lower in height, ensuring a ready mounting of it even in a restricted location, a rotator's smaller rotational torque, a smaller initial flow rate and an improved performance.

In the arrangement of the transmitter unit of the first embodiment, the magnet 72 has to be made relatively great in height so as to obtain a greater output power. In order to avoid this, the magnet 72 is sandwiched with the circular arc sections 81a and 82a of the first and second stators 81 and 82 and the magnet 72 is forced into a repelled state in a manner rotated to the right. If, in this state, the magnet 72 is rotated, it increases its rotation speed and, as shown in FIG. 10, a greater voltage emerges. However, an undesired reverse voltage (b) is developed as pulses, sometimes as two or three pulses, and hence a detection error may occur. According to the second embodiment, it is possible to eliminate such an inconvenience.

Figure 11:
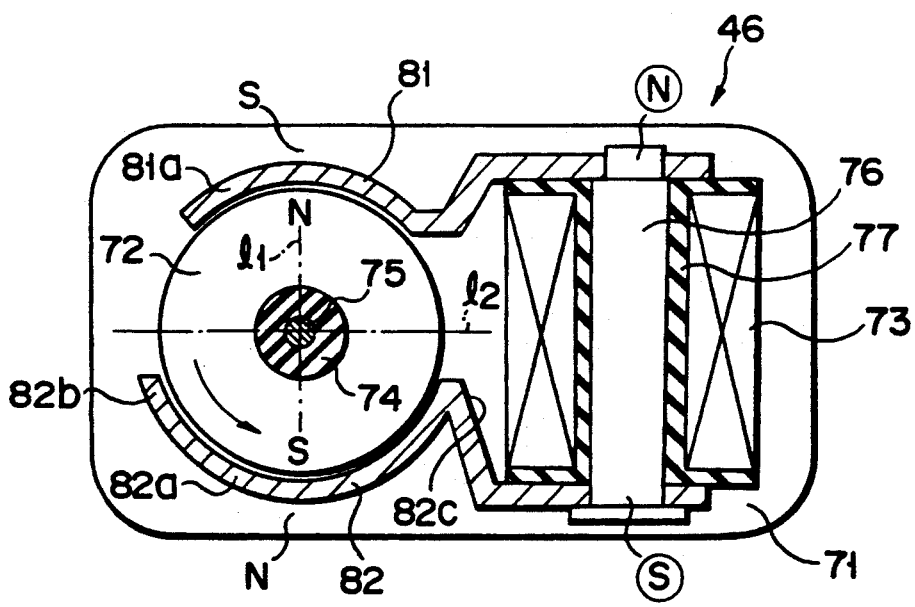
FIG. 11 is a transverse view diagrammatically showing a variant of the power generation mechanism of the second embodiment.
Figure 12:
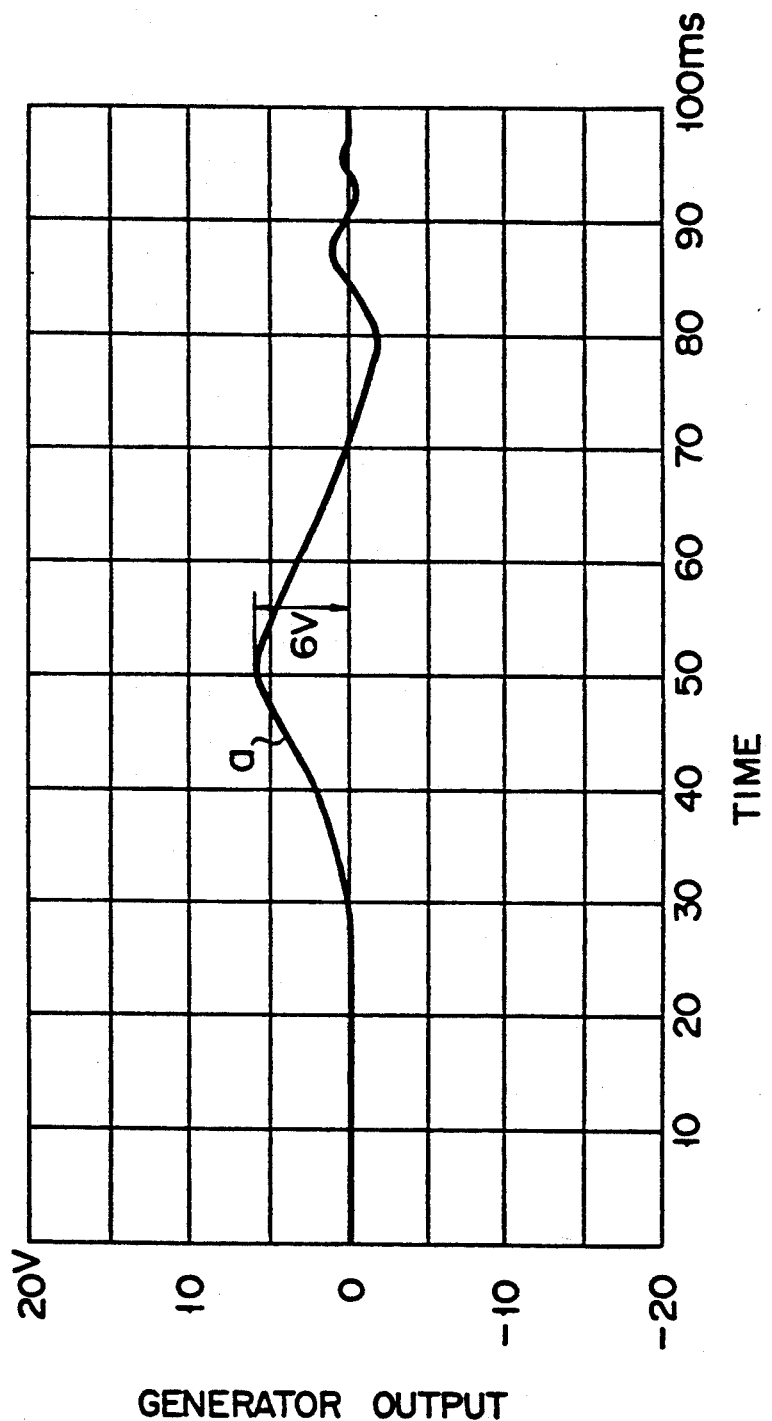
FIG. 12 shows a characteristic curve showing an output voltage of a variant of the power generation mechanism of the second embodiment.

FIGS. 11 to 12 show a variant of the power generation mechanism 46 of the second embodiment. In this variant, a circular-arc section 82a of a second stator 82 is made greater in length than a circular-arc section 81a of a first stator 81, but the base end of the second stator 82 is the same in height as the forward end of the second stator 82 at the location of its circular-arc section 82a. The base and forward ends of the circular-arc section 82a of the second stator 82 make the same angle relative to a center line 12. The circular-arc sections 81a and 82a of the first and second stators 81 and 82 facing the periphery of the magnet 72 in a parallel relation are symmetric to the center line 12 perpendicular to a marginary line 11 passing through the center of the magnet 72 across the N- and S-poles of the magnet 72.

In this variant, a somewhat smaller output voltage emerges than in the second embodiment as shown in FIG. 12, but a merit over the first embodiment is adequately displayed in this variant.

Figure 13:
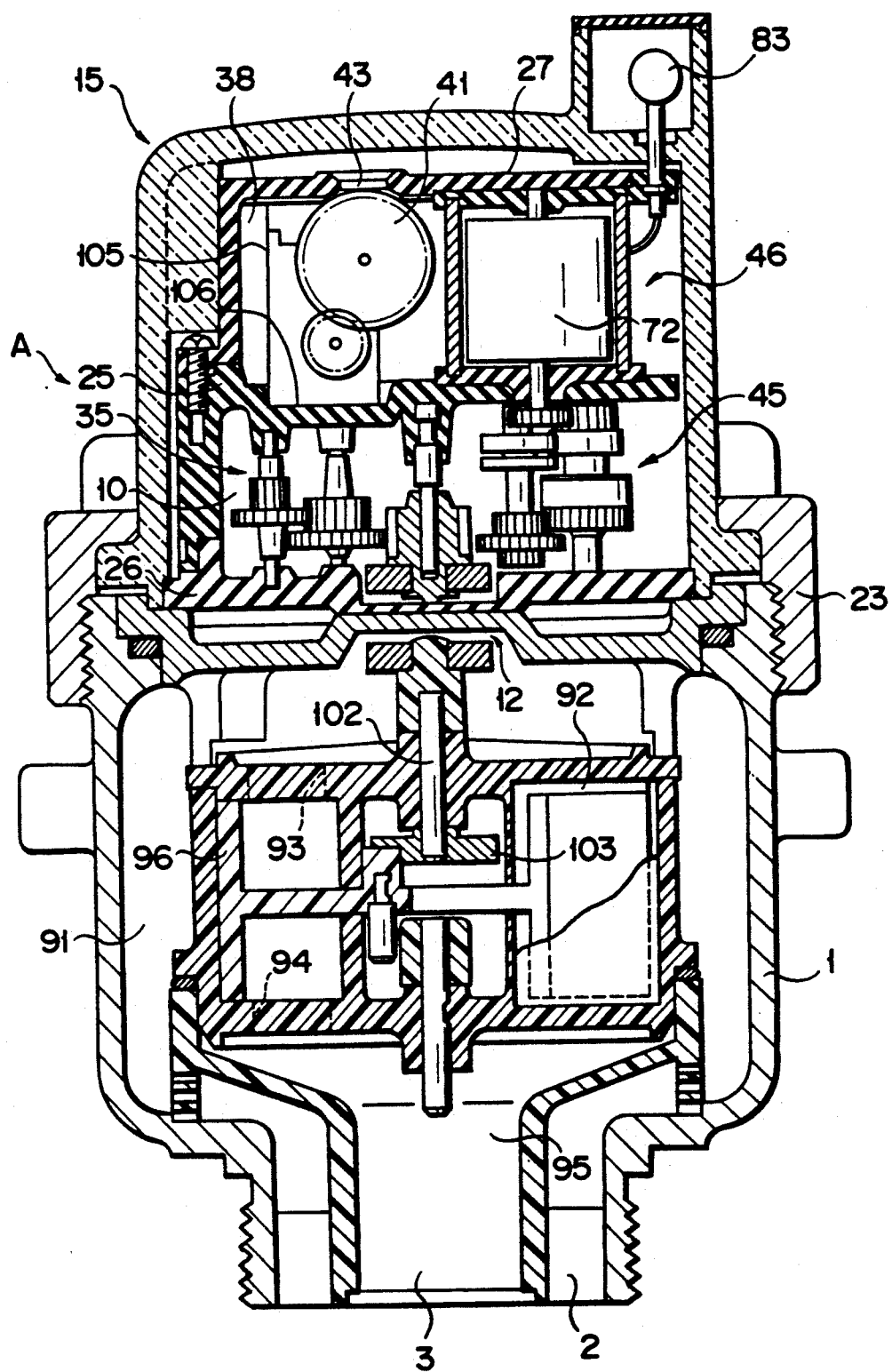
FIG. 13 is a longitudinal cross-section diagrammatically showing a rotary piston type water meter according to a third embodiment of the present invention.

FIGS. 13 and 14 show a rotary piston type water meter A according to a third embodiment of the present invention. In this embodiment, a flow inlet 2 and flow outlet 3 are concentrically provided at the lower portion of the water meter 1 and the flow inlet 2 is formed around the flow outlet 3 and leads to an inflow passage 91 of the water meter 1. The inflow passage 91 communicates past the outer wall of a flow measuring chamber 92 with an inlet 93 which is opened at the top wall of the chamber 92. An outlet 94 is provided at the lower wall of the chamber 92. Within the chamber 92, a rotor (piston) 96 is disposed as a flow detecting means and has a cylindrical circumferential wall 97 with a cutout 99 formed at a portion of the circumferential wall 97. The water meter has a partition wall and cylindrical isolation wall 100 in the chamber 92. The rotor 96 is fitted on the meter at the location of the cutout 99 and a center pin (detection shaft) 101 is rotated in a direction of an arrow in FIG. 14 with the outer peripheral surface of a rockably moving rotor slidable on the inner wall surface of the chamber 92. The center pin 101 is coupled to a crank lever 103 of a transmission rotation shaft 102 to rotate the rotation shaft 102. As in the first embodiment, a magnet coupling 12 is mounted on the other end of the rotation shaft 102. The rotation of the rotation shaft 102 is transmitted by the magnet coupling 12 to a speed reduction gear group 36. A casing 105 for digit wheels 41 is placed down onto a recess 106 provided at an intermediate base plate 25. This arrangement can incorporate a power generation mechanism 46 as a corresponding compact unit, making it possible to increase the size of the casing 105 for the digit wheels 41.

In this type of water meter, running water flows from the flow inlet 2 via the inflow passage 91 and inlet 93 into the chamber 92. Since, in a position as shown in FIG. 14A, the inlet 93 is opened at an area $V_1$ of the rotor 96, an inflow water pressure is exerted on the rotor 96 and the center pin 101 for the rotor 96 is rotated, in a direction of an arrow in FIG. 14A, into a position shown in FIG. 14B. The center pin 101 continues to be rotated under an inflow pressure even in the position shown in FIG. 14B. When the center pin 101 reaches a position shown in FIG. 14C, the area $V_1$ of the rotor 96 is fully closed, but an inflow pressure is exerted, as shown in FIG. 14C, on an area $V_2$ of the chamber 92, enabling the center pin 101 to continue its rotation to a position shown in FIG. 14D where the area $V_2$ of the chamber 92 communicates with the outlet 94 while, on the other hand, water flows into the area of the chamber 92 corresponding to the inlet 93 so that the rotor is rotated. The water stream in the rotor 96 flows out via the outlet 94. Upon a return back to the position as shown in FIG. 14A, the water starts to flow at the area of the chamber 92 corresponding to the inlet 93 and the rotor 96 continues its rotation. In this way, the rotor 96 continues its rotation and the center pin 101 continues its rotation. The number of rotations in this case is proportionate to a quantity of water flowed.

The present invention can be applied also to a measuring meter for measuring a flow rate of a fluid, other than the running water as set out above, such as the measuring of, for example, a gas.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic power generation type flowmeter that generates an electric power signal, as a measuring signal, said flowmeter measuring a flow rate of a fluid flowing through a passage and transmitting the measuring signal to a receiver positioned at a remote location, comprising:
   (1) detecting means, having a detection mechanism for detecting an action and a flow rate of the fluid flowing through the passage, said detecting means further including a rotatable detection shaft driven by the detection mechanism, for converting the detected flow rate into a number of rotations of the detection shaft;
   (2) transmission means for receiving a rotational force from the rotatable detection shaft of the detecting means and for converting said rotations of the detection shaft to an intermittent rotation;
   (3) power generation means coupled to the transmission means for outputting an electric signal corresponding to the detected flow rate of the fluid that had flowed through a passage the power generation means including:
      (a) a rotation shaft, having an axis and extending in an axial direction, said rotation shaft being connected to the transmission means, said rotation shaft having a permanent magnet with N- and S-poles located on first and second opposite sides of the rotation shaft;
      (b) an electromagnetic coil and a core, said core having first and second end portions and an axis passing through both said first and second end portions of said core, said electromagnetic coil being wound around the core, the core being positioned adjacent to the magnet so that the axis of the core is oriented in a direction that is perpendicular to the axis of the rotation shaft;
      (c) a first stator having first and second end portions, the first end portion of the first stator being magnetically coupled to the first end portion of the core and said second end portion of the first stator facing the N-pole of the magnet; and
      (d) a second stator having first and second end portions, the first end portion of the second stator being magnetically coupled to the second end portion of the core and said second end portion of the second stator facing the S-pole of the magnet;
   (4) a casing housing said detected mechanism, said transmission means and said detecting means; and
   (5) a flow indicator means positioned within the casing at a position adjacent to a position of said power generation means, the flow indicator means being connected to receive a rotation force from said transmission means; and wherein
   said second end portion of each of said first and second stators is extended adjacent a locus of movement of the N- and S-poles of said magnet, said locus of movement being defined when the rotation shaft rotates, one of said second end portions extending a different length in a direction away from said core than the other one of said second end portions.

2. An automatic power generation type flowmeter according to claim 1, wherein a width of said magnet, defined along an axial direction of said rotation shaft of said magnet, is substantially equal to a length of said first and second stators defined along the axial direction of said rotation shaft of said magnet.

3. An automatic power generation type flowmeter according to claim 1, wherein said detection mechanism includes an impeller for receiving an action of said fluid flowing through said passage, said impeller rotating said detection shaft.

4. An automatic power generation type flowmeter according to claim 1, wherein said detection mechanism includes a rotary piston for receiving the action of said fluid flowing through said passage said rotary piston rotating said detection shaft.

5. An automatic power generation type flowmeter according to claim 1, wherein said flow indicator means includes display means for displaying the amount of fluid that had flowed through the automatic power generation type flowmeter, said display means having a given dimension, said given dimension of said display means extending in at least a direction that corresponds to the direction of the axis of said rotation shaft of said magnet.

6. An automatic power generation type flowmeter that generates an electric power signal, as a measuring signal, said flowmeter measuring a flow rate of a fluid flowing through a passage and transmitting the measuring signal to a receiver positioned at a remote location, comprising:
   (1) detecting means, having a detection mechanism for detecting an action and a flow rate of the fluid flowing through the passage, said detecting means further including a rotatable detection shaft driven by the detection mechanism, for converting the detected flow rate into a number of rotations of the detection shaft;
   (2) transmission means for receiving a rotational force from the rotatable detection shaft of the detecting mechanism and for converting said rotations of the detection shaft to an intermittent rotation;
   (3) power generation means coupled to the transmission means for outputting an electric signal corresponding to the detected flow rate of the fluid that had flowed through a passage, the power generation means including:
      (a) a rotation shaft, having an axis, connected to the transmission means, said rotation shaft having a permanent magnet with N- and S-poles located on first and second opposite sides of the rotation shaft;
      (b) an electromagnetic coil and a core, said core having first and second end portions and an axis passing through both said first and second end portions of said core, said electromagnetic coil being wound around the core, the core being positioned adjacent to the magnet;
      (c) a first stator having first and second end portions, the first end portion of the first stator being magnetically coupled to the first end portion of the core and said second end portion of the first stator facing the N-pole of the magnet; and
      (d) a second stator having first and second end portions, the first end portion of the second stator being magnetically coupled to the second end portion of the core and said second end portion of the second stator facing the S-pole of the magnet;
   said second end portion of each of said first and second stators being arranged along a locus of movement of the N- and S-poles of said magnet, said locus being defined when the rotation shaft rotates, one of said second end portions extending a different length in a direction away from said core than the other one of said second end portions.

7. An automatic power generation type flowmeter according to claim 6, wherein said second stator has a longer second end portion than the second end portion of said first stator and the first end portion of the second stator extends substantially to a center line 12 that is perpendicular to an imaginary line 11 that only passes through both a center of the magnet but also crosses the N- and S-poles of the magnet.

8. An automatic power generation type flowmeter according to claim 6, wherein the rotation shaft having said permanent magnet is positioned in a direction perpendicular to the axis of said core.

9. An automatic power generation type flowmeter according to claim 6, further comprising:
   a casing housing said detected mechanism, said transmission means and said detecting means; and
   flow indicator means positioned within a casing at a position adjacent to a position of said power generation means, the flow indicator means being connected to receive a rotation force from said transmission means.

10. An automatic power generation type flowmeter according to claim 9, wherein said flow indicator means includes a display means for displaying the amount of fluid that had flowed through the automatic power generation type flowmeter, said display means having a given dimension, said given dimension of the display means extending in at least a direction that corresponds to the direction of the axis of said rotation shaft of said magnet.

11. An automatic power generation type flowmeter according to claim 6, wherein said detection mechanism includes an impeller for receiving the action of said fluid flowing through said passage, said impeller rotating said detection shaft.

12. An automatic power generation type flowmeter according to claim 6, wherein said detection mechanism includes a rotary piston for receiving the action of said fluid flowing through said passage, said rotary piston rotating said detection shaft.

13. An automatic power generation type flowmeter according to claim 6, wherein the core is positioned adjacent said magnet in a direction perpendicular to the rotation shaft.

14. An automatic power generation type flowmeter that generates an electric power signal, as a measuring signal, said flowmeter measuring a flow rate of a fluid flowing through a passage and transmitting the measuring signal to a receiver positioned at a remote location, comprising:
   (1) detecting means, having a detection mechanism for detecting an action and a flow rate of the fluid flowing through the passage, said detecting means further including a rotatable detection shaft driven by the detection mechanism, for converting the detected flow rate into a number of rotations of the detection shaft;

(2) transmission means for receiving a rotational force from the rotatable detection shaft of the detecting means and for converting said rotations of the detection shaft to an intermittent rotation;

(3) power generation means coupled to the transmission means for outputting an electric signal corresponding to the detected flow rate of the fluid that had flowed through a passage, the power generation means including:

(a) a rotation shaft, having an axis, connected to the transmission means, said rotation shaft having a permanent magnet with N- and S-poles located on first and second opposite sides of the rotation shaft;

(b) an electromagnetic coil and a core, said core having first and second end portions and an axis passing through both said first and second end portions of said core, said electromagnetic coil being wound around the core, the core being positioned adjacent to the magnet so that the axis of the core is oriented in a direction that is perpendicular to the axis of the rotation shaft;

(c) a first stator having first and second end portions, the first end portion of the first stator being magnetically coupled to the first end portion of the core and said second end portion of the first stator facing the N-pole of the magnet; and (d) a second stator having first and second end portions, the first end portion of the second stator being magnetically coupled to the second end portion of the core and said second end portion of the second stator facing the S-pole of the magnet; and said second end portion of each of said first and second stators being extended adjacent a locus of movement of the N- and S-poles of said magnet, said locus being defined when the rotation shaft rotates, one of said second end portions extending a different length in a direction away from said core than the other one of said second end portions.

15. An automatic power generation type flowmeter that generates an electric power signal, as a measuring signal, said flowmeter measuring a flow rate of a fluid flowing through a passage and transmitting the measuring signal to a receiver positioned at a remote location, comprising:

(1) detecting means, having a detection mechanism for detecting an action and a flow rate of the fluid flowing through the passage, said detecting means further including a rotatable detection shaft driven by the detection mechanism, for converting the detected flow rate into a number of rotations of the detection shaft;

(2) transmission means for receiving a rotational force from the rotatable detection shaft of the detecting means and for converting said rotations of the detection shaft to an intermittent rotation;

(3) power generation means coupled to the transmission means for outputting an electric signal corresponding to the detected flow rate of the fluid that had flowed through a passage, the power generation means including:

(a) a rotation shaft, having an axis, connected to the transmission means, said rotation shaft having a permanent magnet with N- and S-poles located on first and second opposite sides of the rotation shaft;

(b) an electromagnetic coil and a core, said core having first and second end portions and an axis passing through both said first and second end portions of said core, said electromagnetic coil being wound around the core, the core being positioned adjacent to the magnet;

(c) a first stator having first and second end portions, the first end portion of the first stator being magnetically coupled to the first end portion of the core and said second end portion of the first stator facing the N-pole of the magnet; and (d) a second stator having first and second end portions, the first end portion of the second stator being magnetically coupled to the second end portion of the core and said second end portion of the second stator facing the S-pole of the magnet;

wherein said first and second stators respectively define arcs of two different circles having two different center points, said first and second stators are positioned around said magnet such that said center points of said two different circles are two points that define an imaginary line 11, that not only passes through a center of the magnet but also crosses both the N- and S-poles of the magnet, said second end portion of said first and second stators respectively extend by unequal amounts in a direction that is away from the imaginary line 11 and away from said core; and wherein said second end portion of each of said first and second stators is extended adjacent a locus of movement of the N- and S-poles of said magnet, said locus of movement being defined when the rotation shaft rotates, one of said second end portions extending a different length in said direction away from said core than the other one of said second end portions.

* * * * *